US008576907B2

(12) United States Patent
Demos et al.

(10) Patent No.: US 8,576,907 B2
(45) Date of Patent: **\*Nov. 5, 2013**

(54) HIGH PRECISION ENCODING AND DECODING OF VIDEO IMAGES

(75) Inventors: Gary A. Demos, Culver City, CA (US); David Ruhoff, Marina Del Ray, CA (US)

(73) Assignee: Dolby Laboratories Licensing Corporation, San Francisco, CA (US)

( \* ) Notice: Subject to any disclaimer, the term of this patent is extended or adjusted under 35 U.S.C. 154(b) by 293 days.

This patent is subject to a terminal disclaimer.

(21) Appl. No.: 12/986,270

(22) Filed: Jan. 7, 2011

(65) Prior Publication Data

US 2011/0103471 A1 May 5, 2011

Related U.S. Application Data

(63) Continuation of application No. 09/798,346, filed on Mar. 2, 2001, now Pat. No. 8,374,237.

(51) Int. Cl.
*H04N 7/12* (2006.01)

(52) U.S. Cl.
USPC .................................................. 375/240.03

(58) Field of Classification Search
USPC ........................................ 375/240.1–240.29
IPC ........................................................ H04N 7/12
See application file for complete search history.

(56) References Cited

U.S. PATENT DOCUMENTS 4,654,696 A   3/1987 Dayton et al.
(Continued)

FOREIGN PATENT DOCUMENTS

CA   2127151 A1   3/1995
EP    511778 A2   11/1992
(Continued)

OTHER PUBLICATIONS

The Institute of Electrical and Electronics Engineers, Inc.; IEEE Standard Specifications for the Implementations of 8x8 Inverse Discrete Cosine Transform; 1991; United States of America.

(Continued)

*Primary Examiner* — Tung Vo
(74) *Attorney, Agent, or Firm* — Fish & Richardson P.C.

(57) ABSTRACT

Methods, systems, and computer programs for improved quality video compression. Image quality from MPEG-style video coding may be improved by preserving a higher number of bits during intermediate encoding and decoding processing steps. Problems of inverse discrete cosine transform (IDCT) mismatch can be eliminated by exactly matching the IDCT function numerical algorithm of the decoder to the IDCT function numerical algorithm used for the decoding portion of the encoder. Also included is an application of high precision compression to wide dynamic range images by extending the range of the "quantization parameter" or "QP". The extension of QP may be accomplished either by increasing the range of QP directly, or indirectly through a non-linear transformation. Also included is an application of extended intermediate processing precision and an extended QP range to reduced contrast regions of an image to extend the precision with which the low-contrast portions are compression coded.

21 Claims, 5 Drawing Sheets

(56) References Cited

U.S. PATENT DOCUMENTS

| | | | |
|---|---|---|---|
| 4,722,003 A * | 1/1988 | Kondo | 375/240.24 |
| 4,903,317 A | 2/1990 | Nishihara et al. | |
| 5,231,484 A | 7/1993 | Gonzales et al. | |
| 5,258,835 A * | 11/1993 | Kato | 375/240.12 |
| 5,294,974 A | 3/1994 | Naimpally et al. | |
| 5,307,177 A * | 4/1994 | Shibata et al. | 358/426.03 |
| 5,341,441 A * | 8/1994 | Maeda et al. | 382/253 |
| 5,374,958 A | 12/1994 | Yanagihara | |
| 5,408,270 A | 4/1995 | Lim | |
| 5,426,463 A | 6/1995 | Reininger et al. | |
| 5,438,374 A | 8/1995 | Yan | |
| 5,442,407 A | 8/1995 | Iu | |
| 5,446,498 A | 8/1995 | Boon | |
| 5,465,119 A | 11/1995 | Demos | |
| 5,475,435 A | 12/1995 | Yonemitsu et al. | |
| 5,604,502 A | 2/1997 | Haskell et al. | |
| 5,661,524 A | 8/1997 | Murdock et al. | |
| 5,668,600 A | 9/1997 | Lee | |
| 5,737,032 A | 4/1998 | Stenzel et al. | |
| 5,742,343 A | 4/1998 | Haskell et al. | |
| 5,748,903 A | 5/1998 | Agarwal | |
| 5,751,359 A * | 5/1998 | Suzuki et al. | 375/240.03 |
| 5,757,433 A | 5/1998 | Takano | |
| 5,812,194 A | 9/1998 | Wilkinson | |
| 5,818,529 A * | 10/1998 | Asamura et al. | 375/240.23 |
| 5,825,421 A | 10/1998 | Tan | |
| 5,825,680 A | 10/1998 | Wheeler et al. | |
| 5,835,498 A | 11/1998 | Kim et al. | |
| 5,850,261 A * | 12/1998 | Kondo et al. | 375/240.24 |
| 5,852,565 A | 12/1998 | Demos | |
| 5,877,754 A | 3/1999 | Keith et al. | |
| 5,920,353 A | 7/1999 | Diaz et al. | |
| 5,926,222 A * | 7/1999 | Nickerson | 375/240.04 |
| 5,987,179 A | 11/1999 | Riek et al. | |
| 5,988,863 A | 11/1999 | Demos | |
| 5,995,095 A | 11/1999 | Ratakonda | |
| 5,995,990 A | 11/1999 | Henry | |
| 6,023,297 A * | 2/2000 | Kobayashi | 375/240.03 |
| 6,023,553 A | 2/2000 | Boyce et al. | |
| 6,058,217 A * | 5/2000 | Kondo | 382/251 |
| 6,067,321 A * | 5/2000 | Lempel | 375/240.24 |
| 6,069,914 A | 5/2000 | Cox | |
| 6,104,757 A | 8/2000 | Rhee | |
| 6,115,421 A | 9/2000 | Katta et al. | |
| 6,125,146 A * | 9/2000 | Frencken et al. | 375/240.24 |
| 6,163,574 A | 12/2000 | Yagasaki | |
| 6,167,087 A * | 12/2000 | Kato | 375/240.03 |
| 6,172,768 B1 | 1/2001 | Yamada et al. | |
| 6,178,203 B1 * | 1/2001 | Lempel | 375/240.24 |
| 6,215,824 B1 | 4/2001 | Assuncao | |
| 6,236,727 B1 | 5/2001 | Ciacelli et al. | |
| 6,268,886 B1 | 7/2001 | Choi | |
| 6,301,304 B1 | 10/2001 | Jing et al. | |
| 6,327,602 B1 | 12/2001 | Kim | |
| 6,332,194 B1 | 12/2001 | Bloom et al. | |
| 6,430,222 B1 | 8/2002 | Okada | |
| 6,434,196 B1 | 8/2002 | Sethuraman et al. | |
| 6,442,203 B1 | 8/2002 | Demos | |
| 6,507,615 B1 | 1/2003 | Tsujii et al. | |
| 6,535,148 B1 * | 3/2003 | Kondo et al. | 341/50 |
| 6,611,558 B1 | 8/2003 | Yokoyama | |
| 6,629,104 B1 | 9/2003 | Parulski et al. | |
| 6,650,708 B1 | 11/2003 | Ohgose | |
| 6,654,417 B1 | 11/2003 | Hui | |
| 6,654,420 B1 | 11/2003 | Snook | |
| 6,728,317 B1 | 4/2004 | Demos | |
| 6,816,552 B2 | 11/2004 | Demos | |
| 6,957,350 B1 | 10/2005 | Demos | |
| 7,961,784 B2 | 6/2011 | Demos | |
| 8,374,237 B2 | 2/2013 | Demos et al. | |
| 8,488,670 B2 | 7/2013 | Demos et al. | |
| 2001/0028725 A1 | 10/2001 | Nakagawa et al. | |
| 2002/0186766 A1 | 12/2002 | Adelaide | |
| 2003/0112863 A1 | 6/2003 | Demos | |
| 2003/0112871 A1 | 6/2003 | Demos | |
| 2003/0112873 A1 | 6/2003 | Demos | |
| 2004/0005004 A1 | 1/2004 | Demos | |
| 2005/0254649 A1 | 11/2005 | Demos | |
| 2006/0002467 A1 | 1/2006 | Haskell et al. | |

FOREIGN PATENT DOCUMENTS

| | | |
|---|---|---|
| EP | 531041 A1 | 3/1993 |
| EP | 534350 B1 | 3/1993 |
| EP | 634871 A2 | 1/1995 |
| EP | 1369820 A2 | 12/2003 |
| JP | 6165150 A | 6/1994 |
| JP | 7506954 A | 9/1994 |
| JP | 6350995 A | 12/1994 |
| JP | 11239351 A | 8/1999 |
| JP | 200116457 A | 1/2001 |
| WO | WO9408427 A1 | 4/1994 |
| WO | WO9421083 A1 | 9/1994 |
| WO | WO9504433 A1 | 2/1995 |
| WO | WO9728507 A1 | 8/1997 |
| WO | WO9920040 A1 | 4/1999 |
| WO | WO03007119 A2 | 1/2003 |
| WO | WO2004004310 A2 | 1/2004 |
| WO | WO03041041 A2 | 5/2005 |

OTHER PUBLICATIONS

Office Action issued on Jun. 2, 2003 in Canadian Application No. 2245172.
Office Action issued on Dec. 26, 2003 in Chinese Application No. 97193217.4.
Office Action issued on Dec. 17, 2004 in Chinese Application No. 97193217.4.
Office Action issued on May 27, 2005 in Chinese Application No. 97193217.4.
Notice of Interview issued on May 15, 2005 in Chinese Application No. 97193217.4.
Partial European Search Report issued on Jan. 21, 1999 in European Application No. 97903871.8.
Supplemental European Search Report issued on Feb. 28, 2001 in European Application No. 97903871.8.
Office Action issued on Jan. 11, 2005 in Japanese Application No. 09-527690.
Office Action issued on May 31, 2004 in Korean Application No. 98-705826.
Office Action issue on Jan. 27, 2004 in Mexican Application No. 9806108.
International Search Report issued on May 8, 2007 in PCT Application No. PCT/US97/00902.
International Preliminary Examination Report issued on Oct. 13, 1998 in PCT Application No. PCT/US97/00902.
Written Opinion issued on Jan. 30, 1998 in PCT Application No. PCT/US97/00902.
International Search Report issued on Dec. 6, 2002 in PCT Application No. PCT/US02/18884.
Office Action issued on May 13, 2005 in Chinese Application No. 02805857.7.
International Search Report issued on Sep. 11, 2003 in PCT Application No. PCT/US02/06078.
International Preliminary Examination Report issued on Feb. 20, 2004 in PCT Application No. PCT/US02/06078.
Written Opinion issued on Sep. 4, 2004 in PCT Application No. PCT/US02/06078.
Supplemental European Search Report issued on Dec. 16, 2005 in European Application No. 02746990.7.
International Search Report issued on Jan. 15, 2003 in PCT Application No. PCT/US02/22063.
International Preliminary Examination Report issued on Jun. 14, 2004 in PCT Application No. PCT/US02/22063.
Office Action issued on Mar. 11, 2005 in Chinese Application No. 02813792.2.
International Search Report issued on Jan. 28, 2003 in PCT Application No. PCT/US02/22205.

(56) References Cited

OTHER PUBLICATIONS

International Preliminary Examination Report issued on Mar. 2, 2004 in PCT Application No. PCT/US02/22205.
Written Opinion issued on Apr. 2, 2003 in PCT Application No. PCT/US02/22205.
Office Action issued on Dec. 9, 2005 in Indian Application No. 3813/DELP/2004.
Office Action issued on Oct. 19, 2005 (with Australian Search Report issued on Sep. 23, 2005) in Singapore Application No. 200405790-7.
International Search Report issued on Jan. 10, 2003 in PCT Application No. PCT/US03/20397.
Aravind, R. et al., "Packet Loss Resilience of MPEG-2 Scalable Video Coding Algorithms," IEEE Transactions on Circuits and Systems for Video Technology 6(5): 426-435 (Oct. 1996).
Bloomfield, L., "Copy Protection—déjà vu," Broadcast Engineering 40(11): 14-15 (Oct. 1998).
Color Science: concepts and methods, quantitative data and formulae, Wyszecki and Stiles, John Wiley & Sons, 2nd Edition, pp. 485-489 (1982).
Demos, G., A Comparison of Hierarchical High Definition Imagry Coding Schema,: DemoGraFX Corp. IEEE, pp. 68-75 (1992).
Demos, G., "An Example Representation for Image Color and Dynamic Range Which is Scalable, Interoperable, and Extensible," 135th Technical Conference, Society of Motion Picture and Televison Engineers, Oct. 1993, Los Angeles, CA, 22 pages.
Demos, G., "Temporal and Resolution Layering in Advanced Television," SPIE 2663: 52-68 (Nov. 1995).
Demos, G., "The Use of Logarithmic and Density Units for Pixels," SMPTE Journal 100(10): Oct. 1990, pp. 805-816 (1990).
English language abstract for JP 06165150, published Jun. 10, 1994, entitled: "Dynamic Picture Coding/Decoding Device".
H.261, ITU-T Telecommunication Standardization Sector of ITU, Line Transmission of non-telephone signals. Video Codec for Audio-visual Services at p. X64 kbits, (Mar. 1993), 32 pages.
H.263, ITU-T Telecommunication Standardization Sector of ITU, Series H: Audiovisual and Multimedia Systems, Infrastructure of audiovisual services—coding of moving video. Video coding for low bit rate communication, (Jan. 2005), 226 pages.
H.263 Appendix III, ITU-T Telecommunication Standardization Sector of ITU, Series H: Audiovisual and Multimedia Systems, Infrastructure of audiovisual services—coding of moving video. Video coding for low bit rate communication, Appendix III: Examples for H.263 encoder/decoder implementations, (Jun. 2001), 48 pages.
ISO/IEC 14496-2 International Standard, Information technology—coding of audio-visual objects—Part 2: visual, 2nd Editionm Dec. 1, 2001, 536 pages.
ISO/IEC 14496-2 International Standard, Information technology—coding of audio-visual objects—Part 2: visual, 2nd Edition, Amendment 2: Streaming video profile, Feb. 1, 2002, 64 pages.
Lim, Jae S., "A migration path to a better digital television system," SMPTE Journal 103(1): 2-6 (Jan. 1, 1994).
Patent Abstracts of Japan vol. 1999, No. 13 (Nov. 30, 1999) re: JP 11239351.
Patent Abstracts of Japan, vol. 1995, No. 03 (Apr. 28, 2005) re: JP 06350995.
Pinkerton, Janet, "Digital video stymied by content protection," Dealscope Consumer Electronics Marketplace, Philadelphia, Jan. 1999, vol. 4, issue 1, p. 32.
Puri et al., "Temporal Resolution Scalable Video Coding," Image Processing. 1994 International Conference, IEEE, pp. 947-951 (1994).
Vincent, A., et al., "Spatial Prediction in Scalable Video Coding," International Broadcasting Convention, IEEE Conference Publication No. 413, RAI International Congress and Exhibition Centre, Amsterdam, The Netherlands, Sep. 14-18, 1995, pp. 244-249.
Office Action issued on Aug. 15, 2007 in Canadian Application No. 2439727, 3 pages.
Office Action, issued on May 13, 2008 in Japanese Application No. 2002-570517, 5 pages.

ISO/IEC JTC 1, "Coding of audio-visual objects—Part 2: Visual," ISO/IEC 14496-2 (MPEG-4 Part 2), Dec. 1999, 348 pages.
Hiroshi Yasuda, "International Standards of Multimedia Coding" (Maruzen Kabushiki Kaisha), Jun. 30, 1991, pp. 88-89.
Fumitaka Ono, Hiroshi Watanabe, "Basic Technologies on International Image Coding Standards" (Corona Publishing Co., Ltd.), Mar. 20, 1998, pp. 226-227.
Office Action issued on Oct. 19, 2004 in U.S. Appl. No. 09/798,346, 9 pages.
Office Action issued on Apr. 15, 2005 in U.S. Appl. No. 09/798,346, 12 pages.
Office Action issued on Sep. 14, 2005 in U.S. Appl. No. 09/798,346, 6 pages.
Office Action issued on Apr. 3, 2006 in U.S. Appl. No. 09/798,346, 12 pages.
Office Action issued on Nov. 27, 2006 in U.S. Appl. No. 09/798,346, 7 pages.
Office Action issued on Jan. 21, 2009 in Canadian Application No. 2439727, 2 pages.
Office Action issued on Mar. 9, 2009 in European Application No. 02748364.3, 9 pages.
Dai Ando et al., "Avoiding Accumulation of Deterioration Caused by Iterated DCT Imagecoding", Electronics & Communication ins Japan, Part I—Communications, Wiley, Hoboken, NJ, US, vol. 76, No. 6, Jun. 1, 1993, pp. 1-10.
Erdem, A.T. et al., "Compression of 10-bit Video Using the Tools of mPEG-2," Signal Processing, Image Communication, Elsevier Science Publishers, Amsterdam, NL, vol. 7, No. 1, Mar. 1, 1995, pp. 27-56.
U.S. Examiner's Answer for U.S. Appl. No. 09/905,039 dated Aug. 8, 2007, 11 pages.
U.S. Final Office Action for U.S. Appl. No. 09/905,039 dated Jan. 15, 2004, 6 pages.
U.S. Final Office Action for U.S. Appl. No. 09/905,039 dated Feb. 16, 2006, 6 pages.
U.S. Final Office Action for U.S. Appl. No. 09/905,039 dated Aug. 26, 2005, 5 pages.
U.S. Final Office Action for U.S. Appl. No. 09/905,039 dated Sep. 2, 2004, 5 pages.
U.S. Final Office Action for U.S. Appl. No. 09/905,039 dated Dec. 23, 2004, 7 pages.
U.S. Non-Final Office Action for U.S. Appl. No. 09/905,039 dated Apr. 5, 2004, 7 pages.
U.S. Non-Final Office Action for U.S. Appl. No. 09/905,039 dated Apr. 8, 2005, 8 pages.
U.S. Non-Final Office Action for U.S. Appl. No. 09/905,039 dated Apr. 23, 2008, 10 pages.
U.S. Non-Final Office Action for U.S. Appl. No. 09/905,039 dated Jul. 17, 2003, 9 pages.
U.S. Final Office Action for U.S. Appl. No. 12/176,267 dated Feb. 2, 2010, 7 pages.
U.S. Final Office Action for U.S. Appl. No. 12/176,267 dated May 19, 2010, 10 pages.
U.S. Non-Final Office Action for U.S. Appl. No. 12/176,267 dated Aug. 24, 2009, 14 pages.
U.S. Non-Final Office Action for U.S. Appl. No. 12/176,267 dated Sep. 27, 2010, 10 pages.
U.S. Non-Final Office Action for U.S. Appl. No. 13/272,316 dated Mar. 29, 2012, 15 pages.
U.S. Non-Final Office Action for U.S. Appl. No. 13/325,695 dated Feb. 27, 2012, 36 pages.
U.S. Non-Final Office Action for U.S. Appl. No. 12/986,258 dated Mar. 26, 2012, 31 pages.
U.S. Notice of Allowance for U.S. Appl. No. 12/176,267 dated Apr. 29, 2011, 7 pages.
U.S. Non-Final Office Action for U.S. Appl. No. 13/325,773 dated Apr. 13, 2012, 32 pages.
U.S. Final Office Action for U.S. Appl. No. 13/325,695 dated Apr. 17, 2012, 5 pages.
Notice of Allowance issued in U.S. Appl. No. 09/738,346 on Nov. 2, 2012, 5 pages.

(56) References Cited

OTHER PUBLICATIONS

U.S. Non-Final Office Action; Apr. 26, 2013; United States; U.S. Appl. No. 13/765,238; 5 pages.
U.S. Notice of Allowance issued in U.S. Appl. No. 13/765,238 on May 15, 2013, 6 pages.
U.S. Final Office Action for U.S. Appl. No. 12/986,258 dated Jun. 6, 2012, 15 pages.
U.S. Non-Final Office Action for U.S. Appl. No. 09/798,346 dated Aug. 7, 2012, 21 pages.
Notice of Allowance for U.S. Appl. No. 09/798,346 mailed Nov. 2, 2012, 5 pages.

* cited by examiner

FIG. 1
Prior art MPEG-2 encoder

FIG. 2
Prior art MPEG-2 decoder

HIGH PRECISION ENCODING AND DECODING OF VIDEO IMAGES

CROSS-REFERENCE TO RELATED APPLICATIONS

This application is a continuation (and claims the benefit of priority under 35 USC 120) of U.S. application Ser. No. 09/798,346, entitled "HIGH PRECISION ENCODING AND DECODING OF VIDEO IMAGES," which was filed on Mar. 2, 2001. The disclosure of the prior application is considered part of (and is incorporated by reference in) the disclosure of this application.

TECHNICAL FIELD

This invention relates to video compression, and more particularly to improved quality video compression based on novel improvements to MPEG-like encoding and decoding systems.

BACKGROUND

MPEG Background

MPEG-2 and MPEG-4 are international video compression standards defining a video syntax that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream signals whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used. It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene is redundant. These MPEG standards start compression by creating a reference frame called an "Intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames. Thereafter, since only a small portion of the frames that fall between the reference I frames are different from the bracketing I frames, only the image differences are captured, compressed, and stored. Two types of frames are used for such differences—Predicted or P frames, and Bi-directional Interpolated or B frames.

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames.

Macroblocks are regions of image pixels. For MPEG-2, a macroblock is a 16×16 pixel grouping of four 8×8 DCT blocks, together with one motion vector for P frames, and one or two motion vectors for B frames. Macroblocks within P frames may be individually encoded using either intra-frame or inter-frame (predicted) coding. Macroblocks within B frames may be individually encoded using intra-frame coding, forward predicted coding, backward predicted coding, or both forward and backward (i.e., bi-directionally interpolated) predicted coding.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

It has been known for some time that computation is reduced when determining motion vectors by utilizing a hierarchical motion search. For example, the MPEG algorithms attempt to find a match between "macroblock" regions. MPEG-type and other motion compensated DCT (discrete cosine transform) coders attempt to match each macroblock region in a current frame with a position in a previous frame (P frame) or previous and subsequent frame (B frame). However, it is not always necessary to find a good match, since MPEG can code a new macroblock as a fresh stand-alone ("intra") macroblock in this case without using previous or subsequent frames. In such motion compensated DCT systems, one macroblock motion vector is needed for each macroblock region for MPEG-2. In MPEG-4, a set of 4 motion vectors, corresponding to one vector for each 8×8 region (i.e., 4 vectors per macroblock) is also an optional coding mode.

MPEG Precision

The reference MPEG-2 and MPEG-4 video codec implementations utilize the following encoding methodology:

a) When converting from RGB to YUV color space, only the number of bits that will be coded are kept (for example, MPEG-2 is limited to 8 bits in coding, and thus the YUV values are also limited to 8 bits).

b) When encoding and decoding, only the number of bits that have been coded are preserved, with careful rounding being applied to reduce artifacts.

c) When converting back to RGB, the precision is limited due to the limitations of the number of bits which were preserved (such as 8 bits maximum for MPEG-2).

Figure 1:
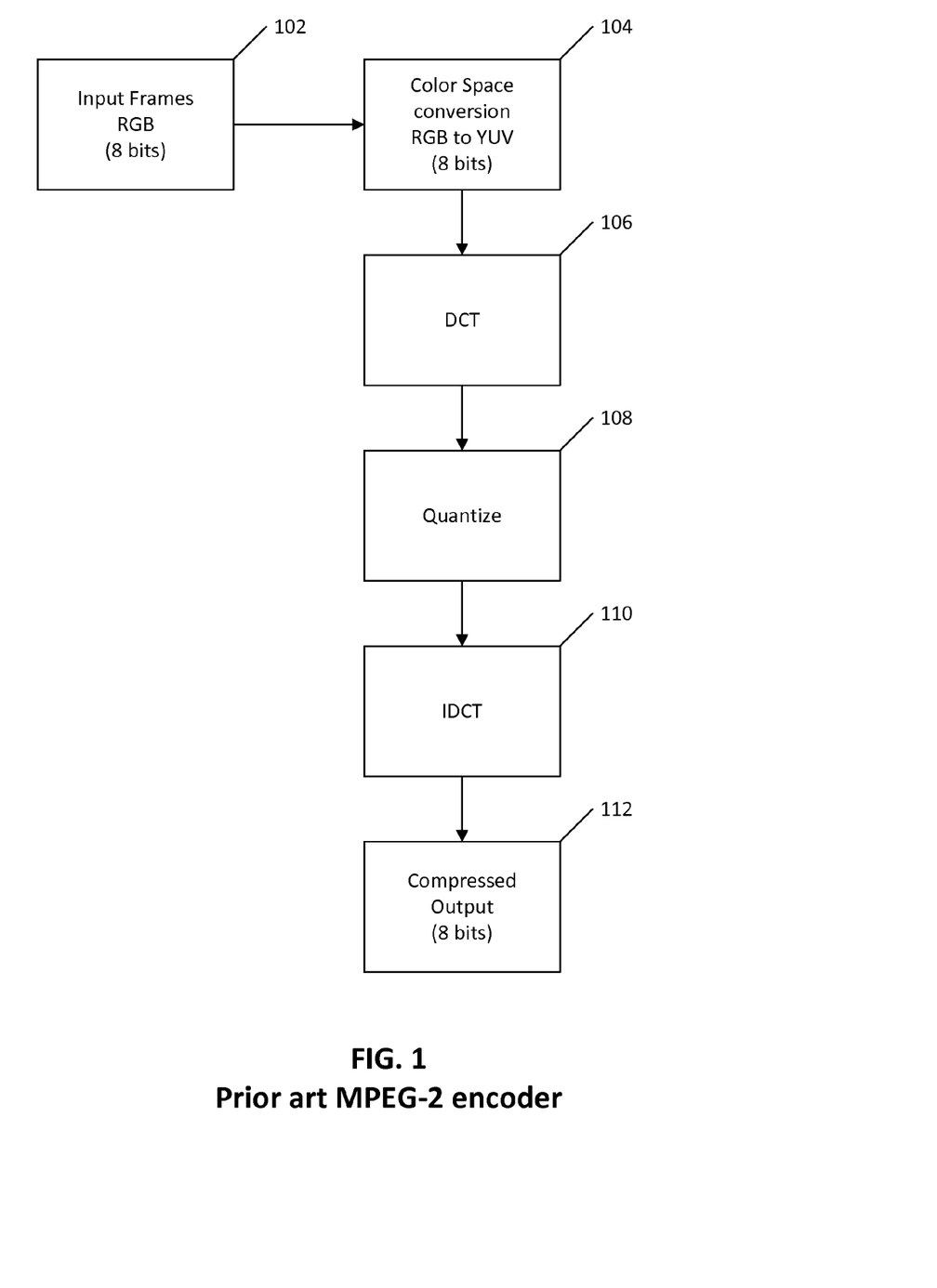
FIG. 1 is a block diagram of a prior art MPEG-2 reference video encoding method.

FIG. 1 is a block diagram of a prior art MPEG-2 reference video encoding method. RGB input frames 102 coded in 8 bits/pixel per color are applied to an RGB-to-YUV converter 104, which is purposely limited to 8 bits of precision per color on its output. The result is applied to a DCT function 106, then to a quantizer function 108, then to an inverse DCT function 110, with the final output 212 being stored at the same precision as the input data.

MPEG-4's reference video coder is implemented with the same method, although the intermediate precision can be extended up to 12 bits (although the VLC—variable length coding—tables do not support use of the full range).

Techniques for randomly dithering the limited precision values (8 bits per color component maximum in MPEG-2) are utilized to reduce the apparent visibility of step changes. However, noise and artifacts in coding are created due to this dither, and are also created due to the use of limited intermediate processing precision.

In addition to limited intermediate processing precision, MPEG-2 and MPEG-4 allow the inverse DCT (IDCT) algorithm used during encoding (often implemented in high precision floating point representation) to differ slightly from the IDCT algorithm used during decoding. This is known as "IDCT mismatch". IDCT mismatch causes an unpredictable gradual drift in the signal away from the intended decoding values. This is conventionally reduced by use of random dither of the low order bit in the IDCT highest frequency (7th harmonic for the typical 8×8 DCT block size used in MPEG-2 and MPEG-4). Such dithering adds additional noise and artifacts to the signal.

Figure 2:
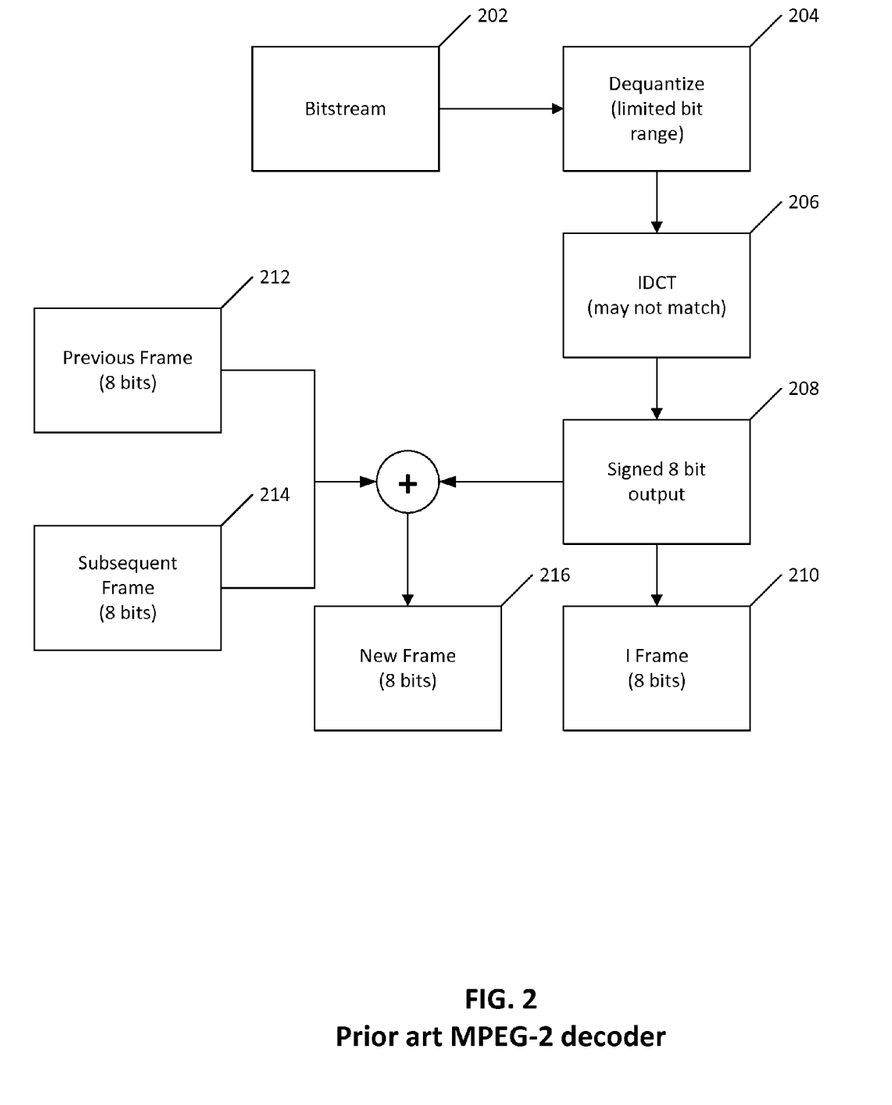
FIG. 2 is a block diagram of a prior art MPEG-2 reference video decoding method.

FIG. 2 is a block diagram of a prior art MPEG-2 reference video decoding method. An encoded input bitstream 202 is applied to a dequantizer function 204 having a limited precision that matches the precision of the input bitstream (typically 8 bits for MPEG-2). The result is applied to an IDCT function 206 (which may not match the IDCT function 110 of the encoder), which output signed 8-bit values 208. This output comprises either an I frame 210, or is combined either with data from a previous frame 212 or a subsequent frame 214 (both at the same precision) to generate a new frame 216. Thus, the MPEG-2 decoding process limits intermediate processing precision to a maximum of 8 bits. Similarly, the intermediate processing precision for MPEG-4 video decoding is also limited to the number of bits used in encoding (a maximum of 12 bits, but often set to be 8 bits).

Limited precision in MPEG-2 and MPEG-4 also limits dynamic range (i.e., the number of levels of lighting that can be represented for an image) and contrast range (i.e., the number of distinct levels assigned to image regions of similar contrast). Accordingly, the encoding and decoding methods used in MPEG-2 and MPEG-4 reduce the potential quality of output, decompressed images compared to the original input images. The present invention addresses these limitations.

SUMMARY

The invention is directed to improved quality video compression based on novel improvements to MPEG-like encoding and decoding systems. In one aspect, the invention provides a method for significantly improving image quality from MPEG-style video coding by preserving a higher number of bits during intermediate encoding and decoding processing steps. Surprisingly, this improvement in quality does not result in a proportionally greater overall number of bits required to encode a sequence of images. Further, the problems of IDCT mismatch can be eliminated by exactly matching the IDCT function numerical algorithm of the decoder to the IDCT function numerical algorithm used for the decoding portion of the encoder. Eliminating the IDCT mismatch allows an increase in compression ratios by reducing the number of required I frames.

In another aspect, the invention includes application of high precision compression to wide dynamic range images by extending the range of the "quantization parameter" or "QP". Dynamic range extension uses a low QP for dark regions and a high QP for bright regions. The extension of QP may be accomplished either by increasing the range of QP directly, or indirectly through a non-linear transformation (such as a function or lookup table) which maps a small range of QP values to a wide range of output QP values for dividing (compression) and multiplying (decompression).

In another aspect, the invention includes application of extended intermediate processing precision and an extended QP range to reduced contrast regions of an image to extend the precision with which the low-contrast portions are compression coded. A low QP can be utilized with low-contrast (often distant) regions, whereas a high QP is utilized for high contrast (usually foreground) regions. In this way, for example, if a camera sensor has sufficient bit resolution, distant objects in the sky or on the ground on a hazy day can be fully distinguished when decompressed.

In particular, in one aspect the invention includes a method for compressing a sequence of digitized video images including a sequence of frames represented at a first precision in a first color space, the method including transforming the sequence of frames to a representation in a second color space at a second precision greater than the first precision, and performing subsequent encoding steps at the second precision to create a compressed output.

Another aspect of the invention is a method for compressing a sequence of digitized video images including a sequence of frames represented at a first precision in a first color space, the method including transforming the sequence of frames to a representation in a second color space at a second precision greater than the first precision; performing a motion compensated discrete cosine transform at the second precision on the sequence of frames to produce a first encoded output; quantizing the first encoded output at the second precision to create a quantized output; performing an inverse discrete cosine transform at the second precision on the quantized output to produce a compressed output at the second precision.

In another aspect, the invention includes a method for compressing and decompressing a sequence of digitized video images including a sequence of frames represented at a first precision in a first color space, the method including encoding the sequence of frames to create a compressed bitstream, and performing decoding steps on the compressed bitstream at a second precision greater than the first precision.

Another aspect of the invention is a method for compressing and decompressing a sequence of digitized video images including a sequence of frames represented at a first precision in a first color space, the method including transforming the sequence of frames to a representation in a second color space at a second precision greater than the first precision; performing subsequent encoding steps at the second precision to create a compressed bitstream; and decoding the compressed bitstream by dequantizing the compressed bitstream at the second precision to create a dequantized output, applying an inverse discrete cosine transform at the second precision on the dequantized output to produce a decompressed output, and generating image frames at the second precision from the decompressed output.

Yet another aspect of the invention is a method for compressing and decompressing a sequence of digitized video images including a sequence of frames represented at a first precision in a first color space, the method including transforming the sequence of frames to a representation in a second color space at a second precision greater than the first precision; performing subsequent encoding steps at the second precision to create a compressed bitstream, including applying an inverse discrete cosine transform numerical algorithm; and performing subsequent decoding steps at the second precision on the compressed bitstream, including applying a matching inverse discrete cosine transform numerical algorithm.

Another aspect of the invention is a method for increasing the average compression ratio during compression of a sequence of digitized video images including a sequence of frames to a compressed bitstream that includes I frames, the method including encoding the sequence of frames by applying an inverse discrete cosine transform numerical algorithm that matches the inverse discrete cosine transform numerical algorithm applied during a subsequent decoding process, thereby generating a compressed bitstream having increased spacing between I frames.

Another aspect of the invention is a method for compressing a sequence of digitized video images having at least one of a wide dynamic range or wide contrast range, the video images including frames represented at a first precision, each frame including a plurality of macroblocks defining regions, the method including determining a quantization parameter, QP, having codes that represent either a direct correspondence to possible values or an extended range of possible values; determining a QP value for each macroblock of each frame; compressing each frame at a second precision higher than the first precision to create a compressed frame, such compressing including applying the determined QP values for such frame to reduce the number of bits required to encode such frame; associating QP codes with the determined QP values used during compressing; and outputting each compressed frame and the associated QP codes.

The invention includes corresponding computer program implementations and apparatus implementations.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Higher Precision Intermediate Image Processing

The limited precision assumptions and techniques within MPEG-2 and MPEG-4 are designed to minimize the amount of memory needed for storing I, B, and P frames. However, frame memory is presently quite affordable. The present invention is based in part on the discovery that a significantly improved image quality can be achieved from MPEG-style video coding by preserving a higher number of bits during intermediate encoding and decoding processing steps. Surprisingly, this improvement in quality does not result in a proportionally greater overall number of bits required to encode a sequence of images. In fact, the number of bits is usually reduced using the present invention.

Figure 3:
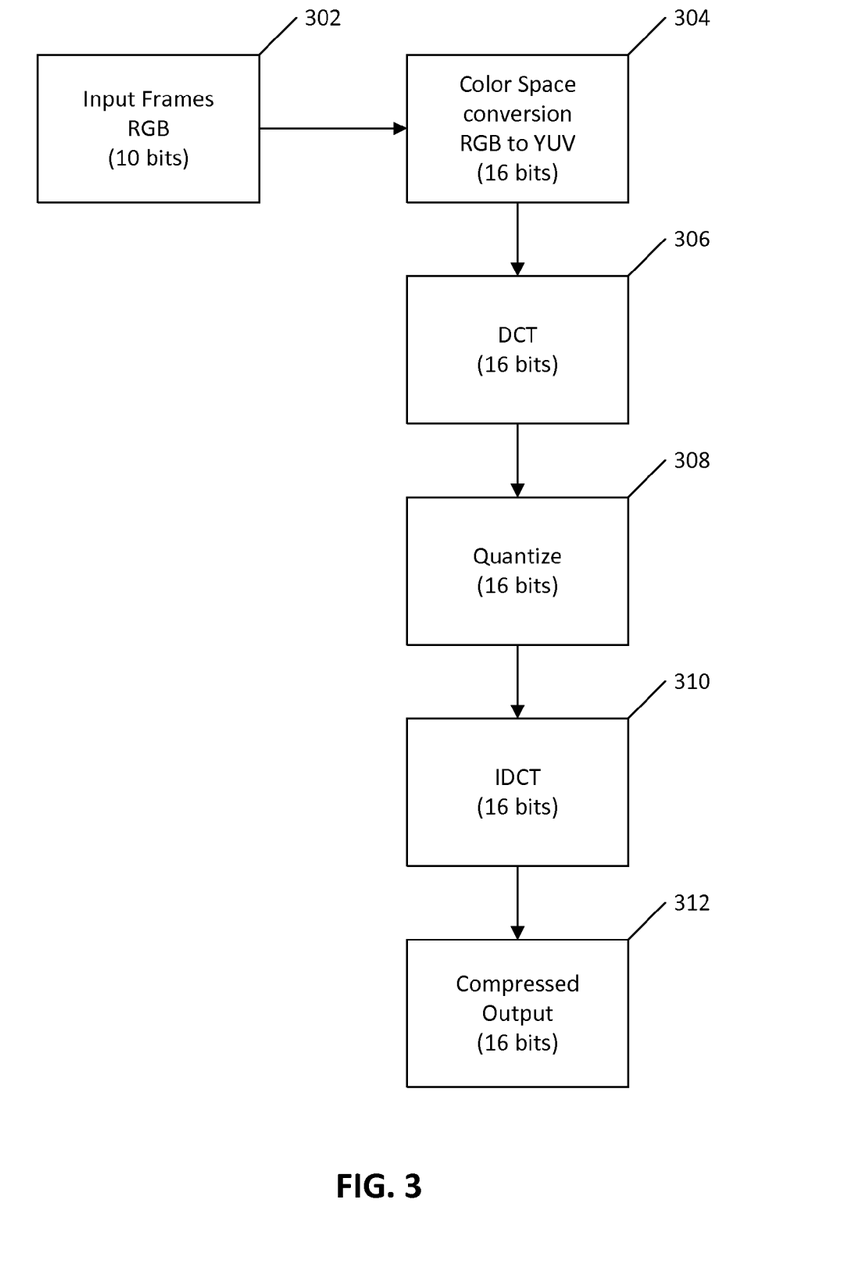
FIG. 3 is a block diagram of an MPEG-like encoding method in accordance with the present invention.

FIG. 3 is a block diagram of an MPEG-like encoding method in accordance with the present invention. RGB input frames 302 are applied to an RGB-to-YUV converter 304. Because modern frame generation devices (e.g., video cameras and high-definition film scanners) can output higher color range (e.g., 10 bits/pixel per color) images, such devices are preferred as the input source. However, the input source may be a conventional MPEG-2 or MPEG-4 8-bit device. The result is applied to a DCT function 306, which preserves more bits of precision (e.g., 16 bits) than are present in the original input signal. The output of the DCT function 306 is applied to a quantizer function 308, then to an IDCT function 310, which again preserves more bits of precision (e.g., 16 bits) than are present in the original input signal (such as 16-bits, signed for P and B frames, unsigned for I frames, 16 bits being a convenient representation for digital hardware and software systems). The final output 312 is typically a YUV signal stored at the same precision as the intermediate processing precision. An important characteristic of such increased precision in the output is that it permits improved prediction of subsequent P and B frames.

The concept of IDCT mismatch which is embodied in MPEG-2 and MPEG-4 video coding is based on the assumption that the computation used for decoding may differ from the computation used for the decoding portion of encoding. As mentioned above, this mismatch will cause drift, even in the presence of the high-harmonic low-bit DCT mismatch dither (which also adds noise). It is common practice in MPEG-2 to place I frames near each other (approximately every half second) to re-correct this drift, and to limit the extent of the error. However, I frames are relatively inefficient, usually costing about 3 times as many bits as P frames, and 5 times as many bits as B frames. I frames also form points of restart and reference during "tune-in" to a motion picture sequence. However, the frequency of their occurrence on stored media could usefully be increased to several seconds (e.g., in the range of about 1 to 5 seconds, on average) to improve efficiency, were it not for the IDCT mismatch.

The IDCT mismatch can be eliminated by exactly matching the numerical algorithms of the IDCT function of the decoder to those of the IDCT function used for the decoding portion of the encoder. Any precision limitations in these matching IDCT functions are automatically corrected at each P frame due to the natural feedback mechanism that arises in going from one P frame to the next via coding its difference signal (which includes the difference of IDCT precision limitations). "Exact matching" of the numerical algorithms means that those portions of the algorithms that transform input to output should apply the same definitions for multiply and add functions, the same numeric representations, the same precision, etc. However, the numerical algorithms need not be identical as to computer program or integrated circuit implementation. Thus, for example, different computer languages and binary generating modes (e.g., interpreted vs. compiled) may be used.

Thus, high quality coding can be achieved by sufficient precision in the IDCT function. However, the IDCT function need not require very high precision. For example, in the MPEG-4 video reference software, a double-width floating point (64-bit) IDCT implementation is used. This is completely unnecessary, since a 16-bit IDCT implementation is sufficient to provide the improvements necessary for coding up to 12-bit dynamic range. Encoder and decoder IDCT implementations (exactly matching) greater than 16 bits, such as 32-bit floating point implementations, can be used to extend the dynamic range up to 16 bits (which results in greater than a 1 billion-to-one dynamic range in less than tenth-percent logarithmic steps, exceeding the limits of human vision). Thus, by exactly matching the encoder and decoder IDCT implementations, the present invention greatly reduces the amount of computation needed for the IDCT implementations while eliminating the problems of IDCT mismatch. Further, and counter-intuitively, using exactly matching encoder and decoder IDCT implementations actually increases overall efficiency (i.e., higher average compression ratio) even with increased intermediate precision, since bit-costly I frames can be spaced further apart in time (e.g., in the range of about 1 to 5 seconds, on average). Indeed, I frames can be spaced apart by virtually unlimited times, limited only by the desire to be able to jump into the middle of a program or to correct errors generated from a lossy distribution channel.

Figure 4:
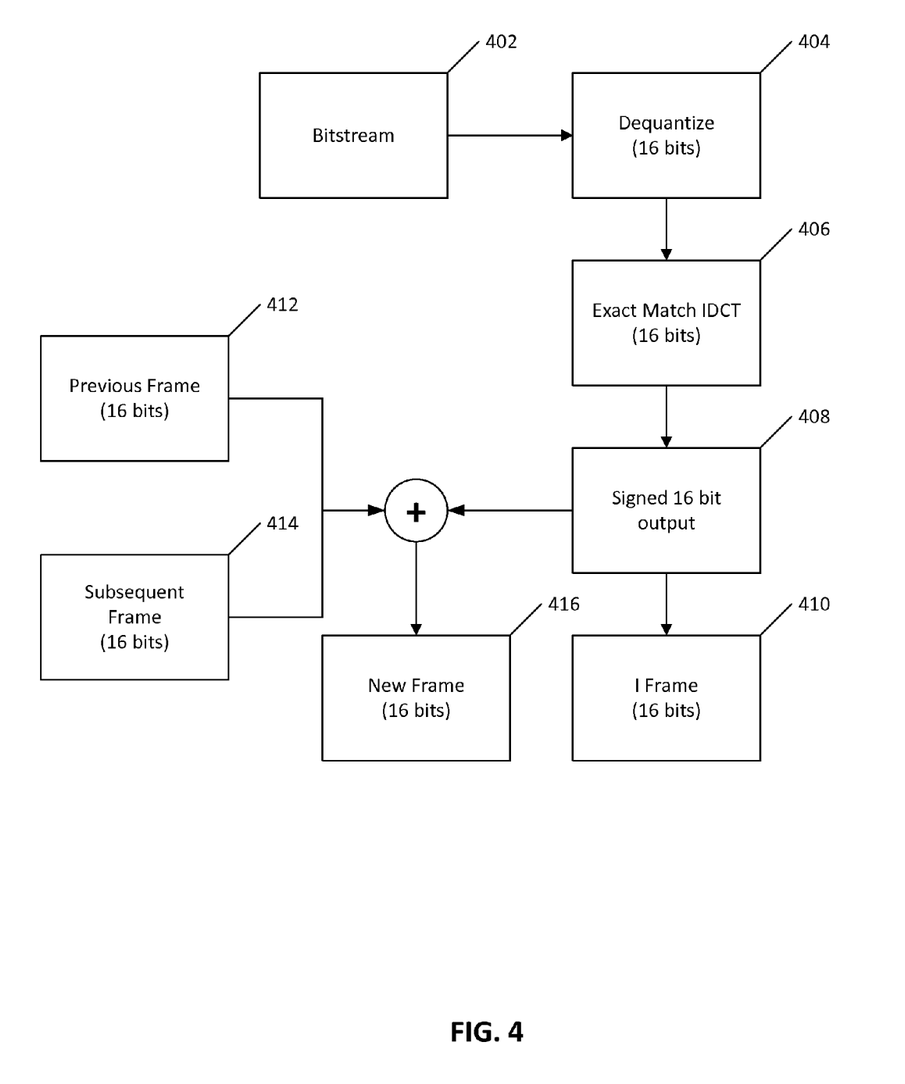
FIG. 4 is a block diagram of an MPEG-like decoding method in accordance with the present invention.

FIG. 4 is a block diagram of an MPEG-like decoding method in accordance with the present invention. A high-precision encoded input bitstream 402 is applied to a dequantizer function 404 having an "intermediate" processing precision that matches the precision of the input bitstream. The result preferably is applied to an IDCT function 406 that is an exact match to the IDCT function 310 of the corresponding encoder. The IDCT function 406 outputs signed values 408 of the same intermediate precision as all prior internal processing steps (e.g., 16 bits). This output comprises either an I frame 410, or is combined either with data from a previous frame 412 or a subsequent frame 414 (both at the same precision) to generate a new frame 416.

In addition, all forms of dither should be eliminated, thus reducing noise and artifacts. In particular, dither from rounding (except at full precision, such as 16 bits—i.e., round the 17th bit), and dither of the low bit of the high harmonic from IDCT mismatch, should both be eliminated. Also, in the preferred embodiment, the additional intermediate pixel precision is used during any final color space conversion step (e.g., YUV to RGB or other conversions, such as YUV 4:2:0 to YUV 4:2:2, for viewing, utilizing, or storing the converted image) during decoding, rounding only at the final step.

It should be noted that the high precision techniques shown in FIG. 3 and FIG. 4 may be used to encode and subsequently decode a standard precision input (e.g., the 8-bit precision input used by MPEG-2). While the result is not as high in quality as encoding and decoding a higher precision input, the result will still be an improvement over present MPEG encoding and decoding. Further, both the encoding and decoding process can be improved by increased precision during intermediate processing and storage. Such precision need not be identical to gain improvement, but the improvement is optimized when the decoding portions of encoding and decoding exactly match in precision and numerical algorithm.

Following is a summary of the preferred embodiment of the present method for improving compressed image quality:

1) Preserve more bits of precision during intermediate processing than the precision of the input (e.g., preserve more bits of precision from the RGB to YUV conversion step during encoding, and preserve more bits of precision from the IDCT step).

2) Store the increased intermediate precision result.

3) Optionally, utilize an exactly matching IDCT implementation in the encoder and decoder.

4) Optionally, eliminate all forms of dither.

5) Utilize the additional pixel precision during the final color space conversion step during decoding, rounding only at the final step.

Dynamic Range and Contrast Extension

The present inventor has previously discussed the concept of gradually increasing the colorimetric and dynamic range of pixel-based image representations. See, e.g., "The Use of Logarithmic and Density Units for Pixels" by Gary Demos, presented at the October 1990 SMPTE conference, and published in in the SMPTE Journal (October 1990, vol. 100, no. 10). See also "An Example Representation For Image Color And Dynamic Range Which Is Scalable, Interoperable, and Extensible" by Gary Demos, presented at the October 1993 SMPTE conference and published in the proceedings and preprints.

The use of a logarithmic representation for pixel values has many benefits. For example, the YUV coding methodology computes U as R-Y, and V as B-Y. In a logarithmic representation, U becomes R/Y and V becomes B/Y, both of which are "isoluminant" in the terminology coined in the 1993 SMPTE paper, "An Example Representation For Image Color And Dynamic Range Which Is Scalable, Interoperable, and Extensible", referenced above. That is, both U and V channels contain no signal under variation of illumination if they have a constant hue. This provides for high efficiency in coding color using the U and V channels. Further, this hue coding efficiency is obtained over a very wide dynamic range of overall brightness. A logarithmic representation also provides for easy methods of system measurement and calibration, as well as being perceptually uniform over a very wide range of brightness.

Table 1 indicates the range and tonal definition capability of various numbers of bits in the range of 9 to 14 bits/pixel. It can be seen from this table that the range of human vision, which spans a range of approximately 10,000,000-to-1 in brightness range, color range, and tonal definition (in ⅛ percent steps), can be approached using a precision of less than 16 bits using a logarithmic representation.

TABLE 1

Number of Bits Required Using Whole, Half, Quarter, & Eighth Percent Logarithmic Steps

| Total Contrast Range | Number of Required Bits | | | |
|---|---|---|---|---|
| | 1% Steps | .5% Steps | .25% Steps | .125% Steps |
| 165:1 | 9 | 10 | 11 | 12 |
| 30000:1 | 10 | 11 | 12 | 13 |
| 700,000,000:1 | 11 | 12 | 13 | 14 |

Current high quality electronic cameras and projectors are capable of operating at approximately 10-bits/pixel per color of dynamic and color range. For example, the Polaroid/Philips LDK9000 camera provides a low-noise image with a wide color range. This camera has an 11 micron CCD pixel size and a full well electron count of approximately 25,000 electrons. Larger sensor sizes are very feasible, with the potential to increase the full well electron count to hundreds of thousands or millions or electrons. On the image projection side, micromirror projectors with 10-bit gamma input are able to achieve a 1000:1 dynamic range with reasonable tonal distinction, thereby approaching the quality of movie film. Although the best films can achieve wider dynamic range (approximately 3000:1) with high tonal fidelity and broad color range, it is now possible to foresee digital imaging and presentation rivaling and eventually exceeding this performance.

As noted above, the quality of moving image compression can be significantly improved by retaining extended precision during intermediate processing. The same mechanism can also be utilized to greatly extend the dynamic range of image information that can be efficiently compressed. For example, if 14 bits of intermediate precision are retained, then this bit range can represent a dynamic range of 700,000,000:1 at ⅛% logarithmic steps.

It is also useful to make the additional observation, not covered in the referenced papers, that brightness distinction is local. Thus, it is not possible to distinguish small brightness variations in a dark shadow area that is immediately adjacent to a very bright object. Thus, it is only necessary to retain tonal and dynamic range distinction with respect to the local brightness in that same region of an image. A different portion of the image, however, might have dark shadows, and might be far enough from the bright region that substantial distinction of detail is seen, requiring corresponding detail in the tonal range of the local brightness representation.

These concepts, combined with the use of extended precision during intermediate processing, can be applied to moving image compression. In particular, once the intermediate precision which is maintained within the compression system is extended to higher numbers of bits, such as 13, 14, 15, or 16, then this extended precision is also capable of representing wide dynamic range images. Further, in order to obtain efficient compression, the perceptual limitation of tonal distinction in bright areas versus the expanded distinction in shadows can be utilized.

In MPEG-like compression systems, the tonal distinction is determined by the "quantization parameter" or "QP". QP is divided into the DCT frequency coefficients to reduce the number of bits required to code a moving image stream. During decoding, the QP is multiplied times the DCT coefficients prior to computing the IDCT. Thus, although QP is applied in frequency (DCT) space, it still represents a tonal precision parameter.

In light of the regional distinction characteristics described above, a high QP can be utilized in areas of high brightness without visible loss of clarity or tone, since tonal distinction is relative to full brightness. However, in the dark image shadow regions, a low QP must be utilized to provide for fine tonal precision.

It is common in MPEG-1, MPEG-2, and MPEG-4 to utilize a linear QP factor in the range of 1 to 32. While this is suitable for an 8-bit dynamic range, such as is provided by MPEG-2, this range is insufficient for higher numbers of bits (such as 10-bits or 12-bits), or for wider dynamic range. In MPEG 2 and MPEG-4, it is possible to vary QP from one macroblock to the next. This is normally the mechanism by which bit rate is adjusted to maintain a constant bit rate. A higher QP produces fewer coded bits, while a lower QP produces more coded bits. Thus, varying QP in the range of 1 to 32 is all that is required in order to maintain a given constant bit rate in a limited precision system such as the 8-bit capability of MPEG-1 or MPEG-2. However, for 10-bit or 12-bit precision, as in MPEG-4, if the amount of scene change is widely varying (high scene stress), and a low constant bit rate is required, then a QP range of 32 possible values may be insufficient. A QP range of 32 values for 10 bits is equivalent to a QP range of 8 values for 8 bits, being only a quarter of the range available to 8-bit coding systems such as MPEG-2. For 12-bit encoding systems, such as MPEG-4, a range of 32 values is equivalent to a QP range of 2 values for 8-bit coding, being only the first sixteenth of the QP range available to an 8-bit system.

It is thus useful to expand the range of QP in the general case. However, note that use of high precision intermediate encoding and/or decoding in conjunction with a direct correspondence between the range of QP and QP values (i.e., a value x is the same as the representation number x; thus, value 14 equals representation number 14) can result in high quality compression and decompression.

It is desirable to maintain the small number of steps in QP (such as 32 or 64 values, or some similar small number) if variation of QP within a frame is desired, since the bits required to code QP variations per macroblock are limited to 2 units in MPEG-4. If QP is varied only once per frame, or once per slice or similar large structure, then the number of values for QP can be large.

If needed, the effective range of QP can be extended to a wide range of determined values (i.e., the values of QP actually applied during compression and decompression) within a small number of representational codes by taking advantage of the perceptually logarithmic nature of dynamic range. Accordingly, a non-linear lookup table can be used to map a small number of representational QP codes (such as the range of 1 to 32, or 1 to 128) into a much wider range of determined QP values (such as 1 to 128, 1 to 256, 1 to 1024, or 1 to 4096). In such a table, the low QP code entries would map nearly one-to-one to determined QP values. For example, QP codes 1 to 4 might map to determined QP output values of 1 to 4. However, the mapping will gradually become steeper, in a logarithmic model, such that QP code 8 might map to determined QP value 16, QP code 16 might map to determined QP value 64, and QP code 32 might map to determined QP value 256. Note that MPEG-2 does provide for a linear QP mode from 1-31, a double-step QP mode that maps each code from 1-31 to twice its value (i.e., to 2-62), and a non-linear QP mode that maps codes 1-31 to determined values 1-112. In MPEG-2, these large determined QP values result in extremely crude coding using 8-bit pixel values. For example, QP values of 62 and 112 correspond to coding only two or one bits, respectively, out of the 8-bit values. Thus, any encoded image using these values would be of extremely poor quality.

Alternatively, if QP is specified once per frame or slice or other large structure, the number of bits available for QP is not limited, and QP values can be fully represented over a very wide range within any appropriate number of bits, including 16 bits, 32 bits, 32 bit floating point, and even higher numbers of bits. However, the conceptual framework of wide dynamic range images is such that some portions of the image are high in brightness, requiring high determined QP values, and other portions are low in brightness, requiring low determined QP values. Thus, it is useful to use a method for efficiently specifying QP values on a regional basis. The existing mechanism of coding systems (such as MPEG-4) of allowing QP values to vary±2 units per macroblock is sufficient if the range of QP codes is limited (such as 1 to 32, as in MPEG-4). However, if a large QP value range is needed, other simple methods of specifying regional QP values are also appropriate and useful.

Thus, the use of regionally-varying QP values is sufficiently general to allow for very wide dynamic range representations which can be highly compressed, and yet be visually indistinguishable from the original moving image.

Attention must be paid to the number of bits available for the coded representation after dividing by determined QP values (dividing the DCT output by QP is also called "quantization"). After quantization, the remaining bits must be coded into the bitstream. The coded bits, except in the case of intra frames and intra macroblocks, represent the difference between the best motion-vector-predicted match in a previous or subsequent frame, and the current frame and current macroblock. The coded representation of this quantized DCT-coded difference will determine the compression ratio that can be achieved.

In MPEG-2 and MPEG-4, the maximum coded value range is ±2047 (limited by the VLC table representation). This corresponds to an unquantized precision of 8-bits. Thus, for unquantized (i.e., QP=1) coding of 10-bit images, it is possible to exceed this maximum coding range by a factor of four. This could happen if the best match predictor block contains a full-scale black to white transition in DC, or the equivalent full-scale AC coefficient change (such as a sharp black-white edge predicted from a flat-gray region). Optimal predictors rarely will provide so poor of a match, and thus full-scale coding will rarely, if ever, be required in this 10-bit example case. However, the range of coded values in a 12-bit moving image, or in even wider 14 or 16-bit images, will often exceed a range limitation such as ±2047. While the ±2047 limit is easily extended, it is conceptually beneficial to attempt to limit the average number of bits being coded. Both the average number of bits, as well as the maximum coded range, are directly reduced by the use of QP values. For example, a QP of 4 extends the dynamic range available with a ±2047 coded representation to include all possible cases of 10-bit coding, and all likely cases of 12-bit moving picture coding. It can therefore be seen that extending QP values to a higher number of values, such as 16, 32, or 64, can further extend the moving image dynamic range that can be represented by a limited number of coded bits, such as a ±2047 range. Such higher QP values not only extend the range, but also reduce the average number of bits being coded, thus yielding high compression.

A key to this concept is that high QP values in wide dynamic range images correspond to image regions having high brightness, which do not require fine tonal distinction. This method of coding wide dynamic range images by maintaining extended precision for frames, and by utilizing high QP values in bright regions and low QP values in dark regions, can achieve high compression ratios with perceptually perfect coding which is indistinguishable from the original.

Thus, the utility of MPEG-like compression techniques can be extended for use in compressing moving wide-dynamic-range images. As cameras, projectors, and other image system components extend their range capabilities, this compression methodology can be applied to make highly efficient compression available. The resulting compression system is therefore extensible over many generations of future technology improvements in imaging systems.

In summary, one aspect of the invention includes application of high precision compression to wide dynamic range images by extending the range of QP values. The extension may be accomplished either by increasing the range of QP values directly, or indirectly through a non-linear transformation (such as a function or lookup table) which maps a small range of QP codes to a wider range of QP values for dividing (compression) and multiplying (decompression). Another aspect of the invention is the determination of such a wide-range QP values based on regional information, or by examination of information available during compression (e.g., DCT coefficients, or the number of bits generated for a given number of candidate QP values, from which an appropriate one is selected), or a combination of the two determination methods.

Extended intermediate processing precision and an extended QP value range can also be applied to coding of both extended and reduced contrast range regions in a moving image. For example, it is common on hazy days to have high contrast on foreground objects, but have decreasing contrast with distance. Objects far away will often have very low contrast. Other common situations, such as the scenes behind the windows of a building or a car windshield, also have reduced contrast due to the glass and reflection of the glass. The reflections also exhibit reduced contrast.

The principles of extended precision and QP value range can be applied to reduced contrast regions of an image to extend the precision with which the low-contrast portions are compression coded. As with dynamic range extension, which uses low QP values for dark regions and high QP values for bright regions, low QP values can be utilized with low-contrast (often distant) regions, whereas high QP values are utilized for high contrast (usually foreground) regions. In this way, if a camera sensor has sufficient bit resolution, distant objects in the sky or on the ground on a hazy day can be fully distinguished when decompressed. Their contrast can subsequently be artificially enhanced, thereby revealing a clear image having a normal dynamic range.

While current cameras and films are limited to approximately 10-bits of gamma or logarithmic dynamic range, future cameras quite likely will have higher precision. Such extended camera image brightness distinction would be useful for viewing detail in low contrast areas, in addition to extending the dynamic range. As with cameras, as projectors extend their dynamic range and their maximum brightness, it is possible to distinguish low contrast details within this extended range. Subtle variations in brightness, such as falling raindrops, are much more easily seen on a wide dynamic range projector than on a limited dynamic range viewing monitor. An object displayed by a wide dynamic range projector is easily distinguished because it has a wide range of brightness variation to the observer, whereas there is a low range of brightness variation on a computer CRT display. Thus, as cameras and displays expand their dynamic range and tonal distinction (i.e., add additional bits of resolution, beyond the current 10-bit capabilities), it will be desirable to expand not only dynamic range but also contrast distinction.

Essentially the same techniques that support extended dynamic range also support high distinction coding of low contrast regions. In particular, QP values are applied to AC coefficients of the DCT output in a manner distinct from the DC coefficient, which is usually coded specially (to improve DC term coding efficiency). The scaling of AC coefficients is therefore naturally ranged about the prevailing DC value. For example, a low contrast region in gray haze will have low amplitude AC coefficients about the DC haze average value. Thus, applying low QP values will naturally preserve subtle tone variations within the low contrast regions. As with extended dynamic range, high QP values allow normal coding of high contrast foreground regions.

In order to adjust QP values to be appropriate for dark regions and hazy regions, yet still be suitable for normal contrast full brightness regions, QP values should be regionally determined with respect to the contrast and brightness of each picture region. This can also be automatically determined if QP values are set for each macroblock such that each macroblock in a region generates approximately the same number of bits. For an image having wide dynamic range, including dark regions, as well as low contrast regions, giving each macroblock a constant number of bits will automatically optimize the representation over the entire range of brightness and contrast. However, it is also desirable to provide more bits to high detail regions than to low detail regions, and to provide more bits to moving regions than static regions.

Determining a QP value for each macroblock can be automated by examining the relative amplitudes of the DCT coefficients in each macroblock. Macroblocks containing DCT coefficients that indicate detail and those that indicate motion can be provided more bits than those macroblocks where the relative weights of coefficients indicate either low detail or low change (motion). However, the noise of the camera sensor must also be taken into account, since noise will behave like both change (motion) and detail (high frequency coefficients). When used with a true wide dynamic range and high distinction sensor of suitable low noise level, the DCT coefficient relative weightings themselves can form an appropriate indicator for automatically setting the value of QP. In particular, larger DCT coefficients yield larger QP values. Accordingly, a mapping or correlation between DCT coefficients and desired corresponding QP values can be empirically determined.

Simple regional algorithms, such as maximum region brightness and contrast, are another method that can be used to determine (or help determine, together with other mechanisms) appropriate QP values. Additional information can also be provided by regional detail amplitude (picture high frequency static) measurement algorithms. Each method has its own advantages. However, the DCT coefficients are themselves sufficient to determine QP values in the case of intra macroblocks. That is, the DCT coefficients are a measure of detail combined with motion for predicted macroblocks, so the use of a separate detail measure (such as a parallel intra DCT transform) can help isolate motion detail changes (such as rain drops or moving water waves on the horizon) from the detail of the current frame image macroblock (static after motion compensation, such as blades of grass with a slowly moving camera). The simplicity of the use of the DCT coefficients themselves to indicate QP makes it a particularly attractive method for practical implementation.

Figure 5:
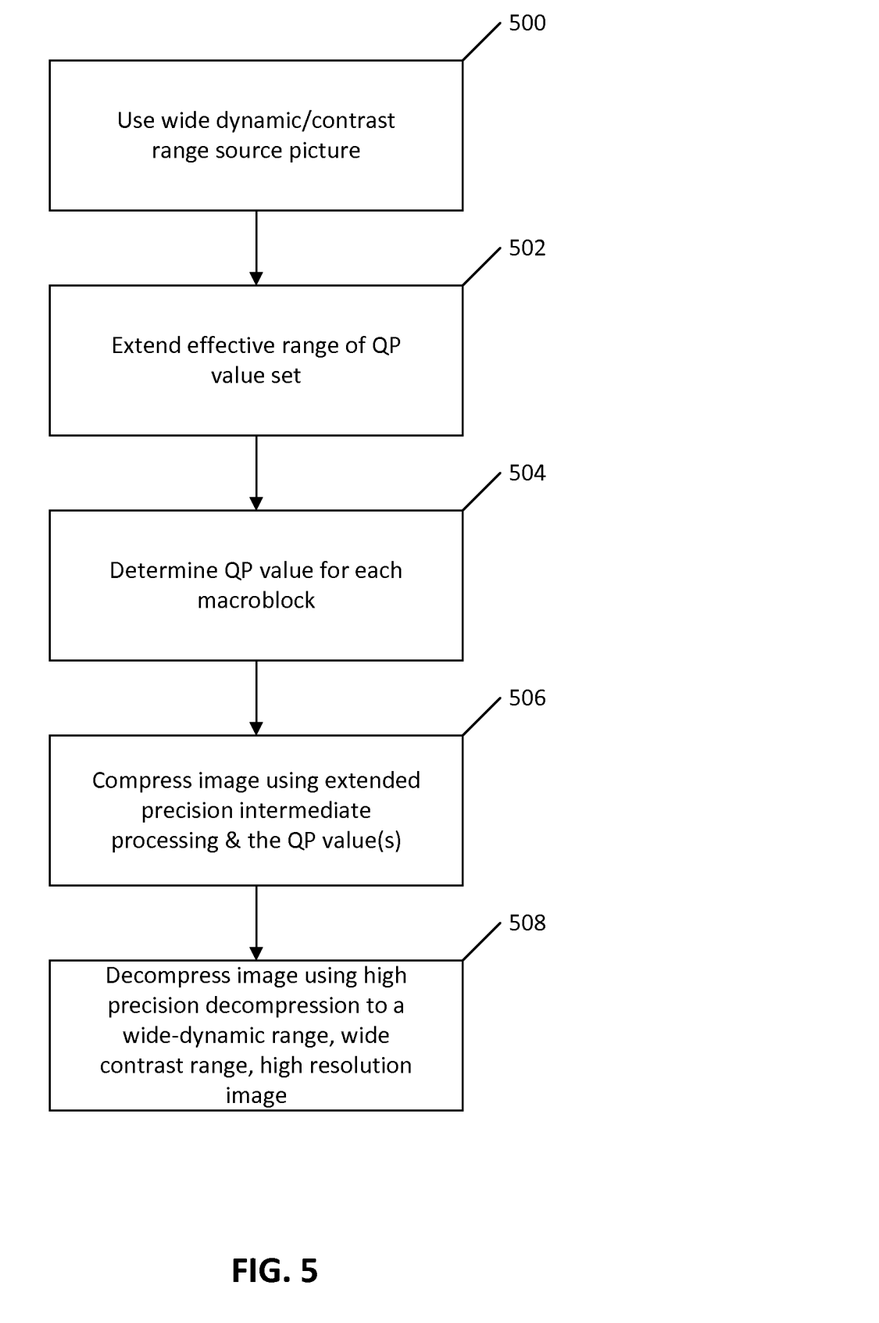
FIG. 5 is a flowchart that summarizes a preferred method of extending dynamic range and/or contrast during image compression.

FIG. 5 is a flowchart that summarizes a preferred method of extending dynamic range and/or contrast during image compression.

Step 500: Begin with a wide dynamic range or wide contrast range source picture.

Step 502: If needed, extend the effective value range of the quantization parameter (QP) code set. This may be done, for example, by one of the following techniques:
1) Extend the set of QP codes from a nominal range (typically 32 levels) to a larger actual range (128, 1024, or 4096 levels, or whatever is appropriate for the image range). Thus, the nominal values directly represent an extended range of possible values.
2) Use a non-linear lookup table or mapping function to correlate nominal QP codes in a non-linear way to a larger effective range of values. The mapping typically would be linear at low values, but increase in effective QP multiply and divide step size as values increase toward a typical range maximum. For example, 32 or 64 codes may be expanded using a non-linear lookup or mapping function to yield a larger effective range having a larger maximum value, such as 128, 1024, 4096, or whatever is appropriate for the image range.

Step 504: Determine the QP value that should be coded for each macroblock of an image undergoing compression, preferably using one of the following methods:
1) Determine an appropriate QP value using algorithms to determine local image region contrast within each frame, local dynamic range within each frame, local detail amplitudes within each frame, and local motion between one or more sequential frames (as described above), from an analysis of the moving image stream
2) Determine a QP value based upon information generated in the compression process, based upon number of bits generated (for a number of candidate values of QP), and the amplitude and frequency of DCT coefficients prior to quantization.
3) Apply a combination of the information from 1) and 2), determining a QP value for each macroblock utilizing both regional information as well as information generated from the compression process.

Step 506: Use extended precision for all intermediate processing, as described above, to compress the image using the determined QP value(s) from Step 504. The compressed image, along with the associated nominal QP codes corresponding to the determined QP values used during compression, may be stored or transmitted, as desired.

Step 508: Decompress the stored or transmitted image, using high precision decompression as described above, to a wide-dynamic range, wide contrast range, high resolution image for various applications. The associated nominal QP codes are mapped, if necessary, back to corresponding determined QP values for such decompression. Such applications include home and theatrical presentation of movies and sports, archiving of stored images, business uses of moving image presentations, government applications (e.g., surveillance, military command and control), etc. The decompressed images can be viewed on wide-dynamic range display devices and/or used as a source for image analysis using algorithms which benefit from (or require) high quality wide-dynamic range images in order to provide optimal analysis (such algorithms are not the subject of this disclosure).

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A method for coding a picture of a wide dynamic range, the method being performed with a video coding system comprising at least an encoder, the method comprising:
   determining a set of representational quantization parameter (QP) codes for quantizing blocks of transformed pixel values in a picture, the set of representational quantization parameter codes having at least 32 values, wherein the set of representational quantization parameters codes is within a first set of levels;
   extending the first set of levels of said representational quantization parameter codes into a second set of levels using a non-linear mapping function, wherein the second set of levels is wider than the first set of levels, depends on an image bit depth, and corresponds to a set of determined quantization parameter (QPd) values, and wherein extending the first set of levels of the representation quantization parameter codes comprises a mapping of respective representational quantization parameter codes to corresponding determined quantization parameter values;
   for a block of transformed pixel values of the picture, selecting a representational quantization parameter code from the set of representational quantization parameter codes;
   for the block of transformed pixel values of the picture, using the mapping to select a determined quantization parameter value for the selected representational quantization parameter code; and
   quantizing the block of transformed pixel values, with the encoder, using the selected determined quantization parameter value.

2. The method of claim 1, wherein the picture is a wide dynamic range picture that has a bit depth greater than 8 bits.

3. The method of claim 2, wherein determining each quantization parameter value is based upon regional information with respect to the picture.

4. The method of claim 3, wherein the regional information includes local image region contrast within the picture.

5. The method of claim 3, wherein the regional information includes local dynamic range within the picture.

6. The method of claim 3, wherein the regional information includes local detail amplitudes within the picture.

7. The method of claim 3, wherein the regional information includes local motion between one or more sequential frames.

8. The method of claim 3, further comprising determining the regional information for a macroblock in the picture based on a brightness and a contrast within the respective macroblock.

9. The method of claim 2, wherein the video coding system further comprises a decoder, wherein the method further comprises:
   accessing the compressed picture by the decoder;
   selecting with the decoder, at least one representational quantization parameter code for a block of transformed pixel values of the received picture;
   for the block of transformed pixel values of the received picture, using the mapping to select the determined quantization parameter value corresponding to the selected representational quantization parameter code; and
   dequantizing, with the decoder, the block of transformed pixel values of the picture using the selected determined quantization parameter value.

10. A method for decoding a picture of a wide dynamic range, the method being performed with a video coding system comprising at least a decoder, the method comprising:
    accessing a compressed picture, wherein the compressed picture comprises coded blocks of transformed pixel values using a first set of levels of a set of representational quantization parameter (QP) codes that have been extended into a wider second set of levels using a non-linear mapping function, wherein the set of representational quantization parameter codes comprises at least 32 values, wherein the wider second set of levels depends on a bit-depth of the picture and corresponds to a set of determined quantization parameter (QPd) values, and wherein the wider second set of levels utilizes a mapping of respective representational quantization parameter codes to corresponding determined quantization parameter values;
    for a block of transformed pixel values of the picture, selecting, with the decoder, at least one representational quantization parameter code from the set of representational quantization parameter codes;
    for the block of transformed pixel values of the picture, using the mapping to select at a determined quantization parameter value corresponding to the selected representational quantization parameter code; and
    dequantizing, with the decoder, the block of transformed pixel values of the picture using the selected determined quantization parameter value.

11. The method of claim 10, wherein the picture is a wide dynamic range picture that has a bit depth greater than 8 bits.

12. An encoder configured to code a picture of a wide dynamic range, the encoder being operable with a video coding system, the encoder being operable to:
    determine a set of representational quantization parameter (QP) codes having at least 32 values, wherein the set of representation quantization parameters codes are within a first set of levels;
    extend the first set of levels of said representational quantization parameter codes into a second set of levels using a non-linear mapping function, wherein the second set of levels is wider than the first set of levels, depends on an image bit depth, and corresponds to a set of determined quantization parameter (QPd) values, and wherein extending the first set of levels of the representation quantization parameter codes comprises a mapping of respective representational quantization parameter codes to corresponding determined quantization parameter values;
    for a block of transformed pixel values of the picture, select a representational quantization parameter code from the set of representational quantization parameter codes;
    for the block of transformed pixel values of the picture, use the mapping to select a determined quantization parameter value for the selected representational quantization parameter code; and
    quantize the block of transformed pixel values of the picture, with the encoder, using the selected determined quantization parameter value.

13. A decoder configured to decode a picture of a wide dynamic range, the decoder being operable with a video coding system, the decoder being operable to:
    access a compressed picture, wherein the compressed picture comprises coded blocks of transformed pixel values using a first set of levels of a set of representational quantization parameter (QP) codes that have been extended into a wider second set of levels using a non-linear mapping function, wherein the set of representational quantization parameter codes comprises at least 32 values, wherein the wider second set of levels depends on a bit-depth of the picture and corresponds to a set of determined quantization parameter (QPd) values, and wherein the wider second set of levels utilizes a mapping of respective representational quantization parameter codes to corresponding determined quantization parameter values;

for a block of transformed pixel values of the picture, select, with the decoder, at least one representational quantization parameter code from the set of representational quantization parameter codes;

for the block of transformed pixel values of the picture, use the mapping to select at a determined quantization parameter value corresponding to the selected representational quantization parameter code; and dequantize, with the decoder, the block of transformed pixel values of the picture using the selected determined quantization parameter value.

14. The decoder of claim 13, wherein the picture is a wide dynamic range picture that has a bit depth greater than 8 bits.

15. The decoder of claim 14, wherein each quantization parameter value is based upon regional information with respect to one or more frames of a picture.

16. A computer program product, stored on a non-transitory computer-readable medium, for decoding pictures of a wide dynamic range, the computer program being operable with a video coding system comprising at least a decoder, the computer program comprising instructions for causing a computer to:

access a compressed picture, wherein the compressed picture comprises coded blocks of transformed pixel values using a first set of levels of a set of representational quantization parameter (QP) codes that have been extended into a wider second set of levels using a non-linear mapping function, wherein the set of representational quantization parameter codes comprises at least 32 values, wherein the wider second set of levels depends on a bit-depth of the picture and corresponds to a set of determined quantization parameter (QPd) values, and wherein the wider second set of levels utilizes a mapping of respective representational quantization parameter codes to corresponding determined quantization parameter values;

for a block of transformed pixel values of the picture, select, with the decoder, at least one representational quantization parameter code from the set of representational quantization parameter codes;

for the block of transformed pixel values of the picture, use the mapping to select a determined quantization parameter value corresponding to the selected representational quantization parameter code; and dequantize, with the decoder, the block of transformed pixel values of the picture using the selected determined quantization parameter value.

17. The computer program product of claim 16, wherein the picture is a wide dynamic range picture that has a bit depth greater than 8 bits.

18. The computer program product of claim 17, wherein each quantization parameter value is based upon regional information with respect to one or more frames of a picture.

19. A method to decode a picture with a decoder, the picture comprising coded blocks of transformed pixel values, the method comprising:

for a block of transformed pixel values of the picture, receiving a representational quantization parameter code from a first set of levels of representational quantization parameter codes, the first set of levels of representational quantization parameter codes having at least 32 values;

mapping using a non-linear mapping function the received representational quantization parameter code from the first set of levels to a second set of levels for determined quantization parameter values, the second set of levels differing in number of levels from the first set of levels; and dequantizing the block of transformed pixel values of the picture using the determined quantization parameter.

20. The method of claim 19, wherein the non-linear mapping function is linear for mapping a first portion of the first set of levels and non-linear in mapping a second portion of the first set of levels, the second portion comprising level values that are greater than the level values of the first portion.

21. The method of claim 19, wherein the second set of levels has a great number of levels than the first set of levels.

* * * * *